United States Patent [19]
Hill

[11] 3,934,204
[45] Jan. 20, 1976

[54] AM/AGC WEIGHTED DIVERSITY COMBINER/SELECTOR

[75] Inventor: Eugene R. Hill, Thousand Oaks, Calif.

[73] Assignee: The United States of America as represented by the Secretary of the Navy, Washington, D.C.

[22] Filed: Oct. 4, 1974

[21] Appl. No.: 512,273

[52] U.S. Cl. .................. 325/304; 325/305
[51] Int. Cl.² ............................ H04B 1/06
[58] Field of Search .............. 325/302–306

[56] References Cited
UNITED STATES PATENTS

| | | | |
|---|---|---|---|
| 3,187,257 | 6/1965 | Miyagi | 325/305 |
| 3,302,115 | 1/1967 | Shiki | 325/304 |
| 3,305,781 | 2/1967 | Robinson | 325/305 |
| 3,609,663 | 9/1971 | Bickford | 325/305 |

Primary Examiner—Albert J. Mayer
Attorney, Agent, or Firm—Richard S. Sciascia; J. M. St.Amand; Darrell E. Hollis

[57] ABSTRACT

An AM/AGC weighted diversity combiner utilizing the AGC and AM voltages from the AGC loops of a pair of receivers for generating an optimum weighting signal or combining ratio.

37 Claims, 11 Drawing Figures

(a) N-CHANNEL COMBINER (b) DUAL-CHANNEL COMBINER

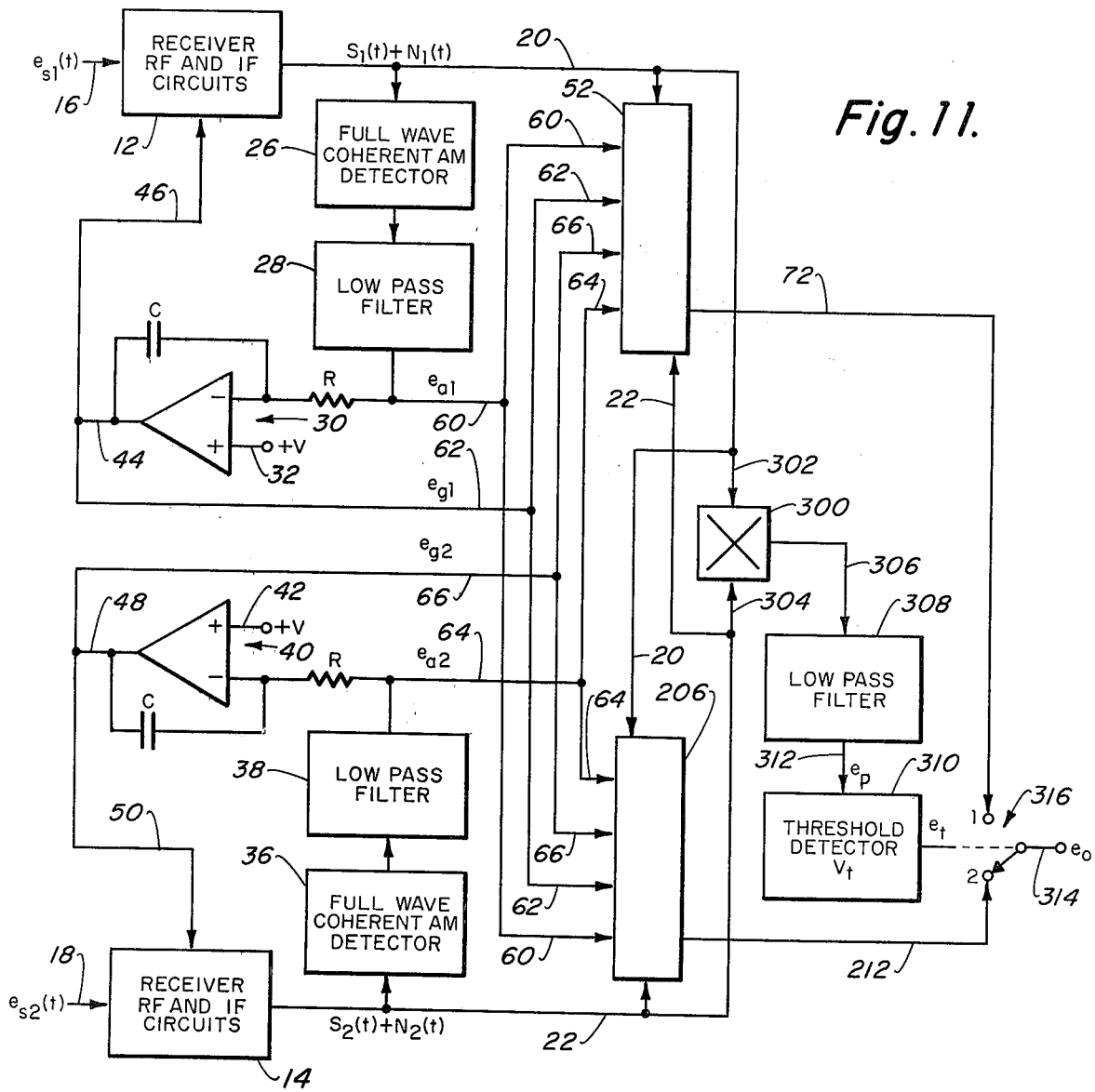

AM/AGC WEIGHTED DIVERSITY COMBINER/SELECTOR

BACKGROUND OF THE INVENTION

1. Field of the Invention

The present invention relates generally to weighted diversity combiners and more particularly to such combiners utilizing both AGC and AM voltages for weighting a maximalratio combiner.

2. Description of the Prior Art

Combiners in the past have used only the AGC voltages of the RF receivers to weight the combiner with the following limitations resulting. Prior art AGC weighted combiners will perform as maximal ratio (optimum) combiners provided the AGC system is able to track perfectly the envelope of the fades (fluctuations) in the RF signal strengths, i.e., such as to maintain the amplitudes of the linear IF signals constant. The bandwidth of the AGC system is limited due to stability considerations in the RF receiver, consequently the major limitations of the conventional AGC weighted combiner arises from the inability of the AGC system to track the higher frequency RF fading envelopes encountered in practice.

SUMMARY OF THE INVENTION

The present invention comprises an AM/AGC weighted diversity combiner utilizing the AM and AGC voltages from the automatic gain control circuits of a pair of receivers for weighting, thereby providing a combiner which is not limited by the tracking rate of the automatic gain control circuits of the receivers.

Accordingly, one object of the present invention is to provide a combiner that is not dependent on the tracking rate of the automatic gain control loops of the receivers.

Another object of the present invention is to provide a combiner that utilizes the AM and AGC voltages from the automatic gain control circuits of a pair of receivers for weighting.

Another object of the present invention is to reduce cost and increase efficiency.

Other objects and a more complete appreciation of the present invention and its many attendant advantages will develop as the same becomes better understood by reference to the following detailed description when considered in connection with the accompanying drawings in which like reference numerals designate like parts throughout the figures of drawing thereof and wherein.

BRIEF DESCRIPTION OF THE DRAWINGS

FIG. 10 is a schematic diagram of part of the circuit of FIG. 9.

FIG. 11 is a block diagram of an AM/AGC weighted combiner/selector.

DETAILED DESCRIPTION OF THE PREFERRED EMBODIMENT

I. BASIC ASSUMPTIONS AND EQUATIONS OF LINEAR DIVERSITY COMBINERS

Figure 1:
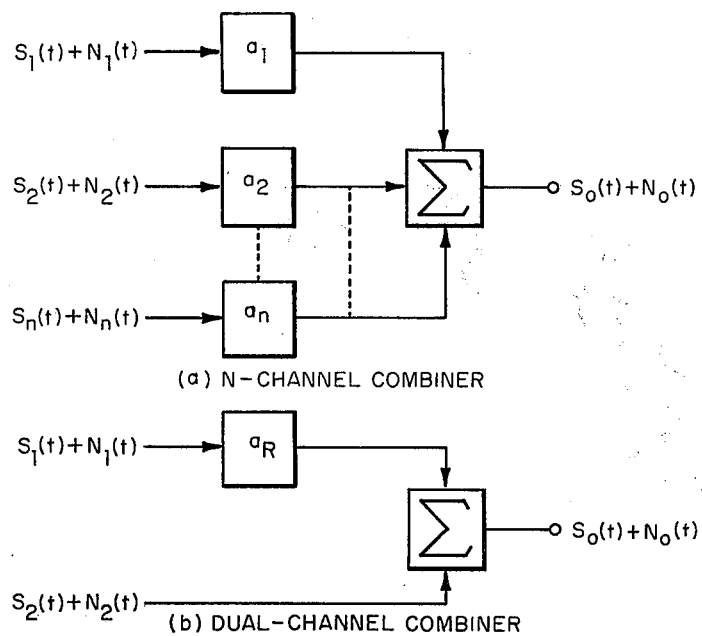
FIGS. 1a and 1b are block diagrams of prior art N-channel and dual-channel linear diversity combiners.

A linear combiner sums the signal plus noise of a number n of diversity channels after applying appropriate weighting factors. The output of a linear combiner can thus be described by the following equation:

$$S_o(t) + N_o(t) = a_1 [S_1(t) + N_1(t)] + a_2 [S_2(t) + N_2(t)] + \ldots + a_n [S_n(t) + N_n(t)] \quad (1)$$

where $S_j(t)$ and $N_j(t)$ are the instantaneous input signal and noise voltages of the $j$th channel and $S_o(t)$ and $N_o(t)$ are the resulting output signal and noise voltages. The implementation of equation (1) in block diagram form appears in FIG. 1(a). The signal-to-noise ratio at the output of the combiner can be written $$\frac{S_o}{N_o} = \frac{a_1 S_1 + a_2 S_2 + \ldots + a_n S_n}{\sqrt{(a_1 N_1)^2 + (a_2 N_2)^2 + \ldots + (a_n N_n)^2}} \quad (2)$$

where $S_j$ and $N_j$ are the local ("local" means that the measurement (e.g., rms) is made over an interval of time which is short enough that the RF envelope can be regarded as constant) rms voltages of the input signals and noises and $S_o$ and $N_o$ are the local rms output signal and noise voltages. It has been shown (see Brennan, D. G., "Linear Diversity Combining Techniques," PROC INST RADIO ENG, Vol. 47, No. 6, Jun 1959) that the maximum output SNR occurs when the coefficients $a_j$ are equal to $$a_j = \frac{S_j}{N_j^2} \quad (3)$$

where $N_j^2$ is the mean square noise voltage from the $j$th diversity channel. This result is based on the following assumptions concerning the input signals and noises:

1. The signal and noise in each channel are statistically independent.
2. The signals are coherent (phase-aligned).
3. The noise components are uncorrelated and have mean values of zero.

When the coefficients are given by equation (3), the output SNR in equation (2) is maximized and reduces to the form $$\left(\frac{S_o}{N_o}\right)_{MAX} = \sqrt{\left(\frac{S_1}{N_1}\right)^2 + \left(\frac{S_2}{N_2}\right)^2 + \ldots + \left(\frac{S_n}{N_n}\right)^2} \quad (4)$$

For a dual-channel combiner, equation (2) can be written in the form $$\frac{S_o}{N_o} = \sqrt{\frac{a_R S_1 + S_2}{a_R^2 N_1^2 + N_2^2}} \quad (5)$$

where $$a_R = \frac{a_1}{a_2}$$

and will be called the combining ratio. The single coefficient is a convenience when working with a dual-channel combiner. The implementation takes the form shown in FIG. 1(b). Equation (5) is maximized by the use of equation (3) when $$a_R = \frac{\left(\frac{S_1}{N_1^2}\right)}{\left(\frac{S_2}{N_2^2}\right)} = \left(\frac{S_1}{S_2}\right)\left(\frac{N_2}{N_1}\right)^2 \quad (7)$$

and assumes the form given in equation (4).

Equation (7) describes the nature of the control signal for a maximal-ratio, dual-channel combiner. For a given communications system, a control signal matching this characteristic must be generated.

II. PERFORMANCE OF PRIOR ART AUTOMATIC GAIN CONTROL (AGC) WEIGHTED COMBINERS

In modern receivers the linear intermediate frequency (IF) signal is amplitude-detected, integrated and fed back to gain control circuits in the RF and IF amplifiers. The response time of the control is limited by the integrator. For a constant input signal strength or when the changes are slow enough for the control loop to follow, the IF output signal will be maintained at a constant amplitude. If the input signal strength is changing at a rate which the AGC loop cannot track perfectly, the amplitude of the IF output signal will fluctuate from its normal amplitude. The performance of an AGC weighted combiner will be considered for these two situations.

Figure 2:
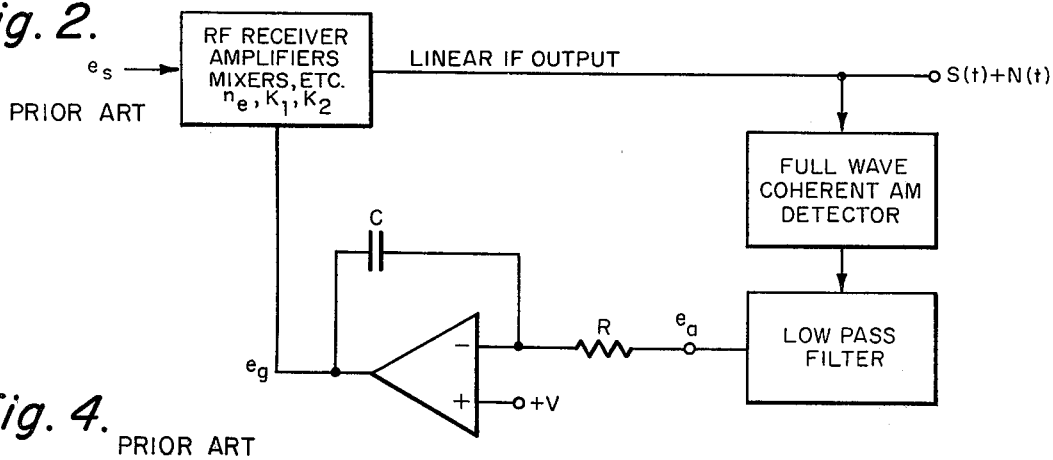
FIG. 2 is a block diagram of a prior art radio frequency receiver with AGC system.

A. AGC System Behavior and Predicted Combiner Performance for Perfect AGC Tracking The AGC control loop of a modern receiver can be modeled as shown in FIG. 2 where $e_s$ is the local rms value of the input signal strength, $e_a$ is the local filtered output of the coherent AM detector (average absolute value), and $e_g$ is the AGC voltage at the integrator output. The value of $e_a$ needs to be defined more completely. In the absence of noise, the average output of a fullwave coherent AM detector is equal to the average absolute value of the input. Therefore, if the bandwidth of the low pass filter (LPF) in FIG. 2 is low compared to the intermediate frequency (a condition normally satisfied), then the local value of $e_a$ can be expressed by $$e_a = \frac{1}{nT_i} \int_t^{t+nT_i} |S(t)| dt \quad (7a)$$

where $S(t)$ is the instantaneous voltage of the linear IF signal and n is an integer. It is seen that this integral is performed over an integral number of cycles of the IF signal. The local condition is satisfied provided n is small enough that the magnitude of S(t) is essentially constant over the interval $nT_i$ where $T_i$ is the local period of the IF signal. The narrow-band, gaussian noise of the RF receiver will produce perturbation of the $e_a$ and $e_g$ voltages, but no DC components. The effects of these perturbation noises are not considered in this analysis.

The integrator time constant is RC (product of the input resistor and feedback capacitor of the integrator). The operational amplifier is assumed to have large open loop gain such that the AM detector output $e_a$ will essentially equal V (bias voltage on the AGC integrator) for constant input signal strength $e_s$ and be independent of the magnitude of $e_s$. (If the bias to the operational amplifier is supplied as a bias current $I_B$ then V is replaced by $I_B R$ where R is the input resistor of the AGC integrator.) A coherent AM detector is assumed so that $e_a$ will be essentially independent of the noise N(t) which is superimposed upon the linear IF output signal S(t). It is assumed that the noise which passes through the low pass filter following the AM detector can be ignored without serious loss in the analysis. This LPF is also assumed to have sufficient bandwidth to pass all significant frequency components of the fading envelope of the input signal $e_s$. An analysis based on these assumptions should still be in fair agreement with the results when a noncoherent AM detector is used.

For constant RF input signal $e_s$, or when perfect tracking occurs such that the AM detector output $e_a$ is held equal to V (bias on integrator), the relationship between $e_s$ and $e_g$ (AGC voltage) is given by $$e_g = -K_1 \log K_2 e_s \quad (8)$$

where $K_1$ and $K_2$ are constants unique to the particular receiver. A derivation of equation 8 is omitted. The symbol "log" will imply logarithm to the base 10 throughout. Equation (8) expresses the AGC voltage as a function of the input signal strength. The input signal strength can be expressed as a function of the AGC voltage by transforming equation (8)

$$e_s = 1/K_2 \; 10^{-(e_g/K_1)} \quad (9)$$

The noise at the output of an RF receiver is primarily thermal in nature and originates in the front end (first amplifier) of the receiver. The effective input noise voltage $n_e$ (rms) of an RF receiver can be expressed by $$n_e = \sqrt{kTBF} \quad (10)$$

where
- $k$ = Boltzmann's constant
- $T$ = absolute temperature (degree Kelvin)
- $B$ = effective bandwidth of the receiver
- $F$ = noise figure of the receiver Note that $n_e$ is actually the output noise per unit gain of the receiver. Also, $n_e$ is a constant at a given receiver temperature. The IF output signal and noise voltages can be expressed in terms of the receiver input signal and noise and the gain of the receiver G as follows $$S = Ge_s \quad (11)$$
$$N = Gn_e \quad (12)$$

By dividing equation (11) by equation (12), the receiver output SNR can be expressed in terms of the input SNR $$\frac{S}{N} = \frac{e_s}{n_e} \quad (13)$$

Since $n_e$ is a constant (at a given temperature), the output SNR is seen to be directly proportional to the input signal strength. By substituting equation (9) into equation (13), the output SNR can be expressed as a function of the AGC voltage $$\frac{S}{N} = \frac{1}{K_2 n_e} 10^{-(e_g/K_1)} \quad (14)$$

which is the relationship that is assumed when implementing an AGC weighted combiner. Consider two similar receivers of the type shown in FIG. 2 with independent RF envelopes $e_{s1}$ and $e_{s2}$. If the integrator bias voltages V are equal (and we assume perfect AGC tracking of $e_{s1}$ and $e_{s2}$) then the rms output voltages $S_1$ and $S_2$ will also be equal. This permits the combining ratio in equation (7) to reduce to $$a_R = \left(\frac{N_2}{N_1}\right)^2 \quad (15)$$

However, since the output signals are equal, this can just as well be expressed in terms of the SNRs of each channel $$a_R = \frac{\left(\frac{S_1}{N_1}\right)^2}{\left(\frac{S_2}{N_2}\right)^2} \quad (16)$$

Assuming that the relevant parameters ($K_1$, $K_2$, $n_e$) of the two receivers are equal (usually effected by calibration) the combining ratio for an AGC weighted predetection combiner is obtained by substituting equation (14) (for each receiver) into equation (16)

$$a_R = 10^{K \, 2/1 \, (e_{g2} - e_{g1})} \quad (17)$$

Figure 3:
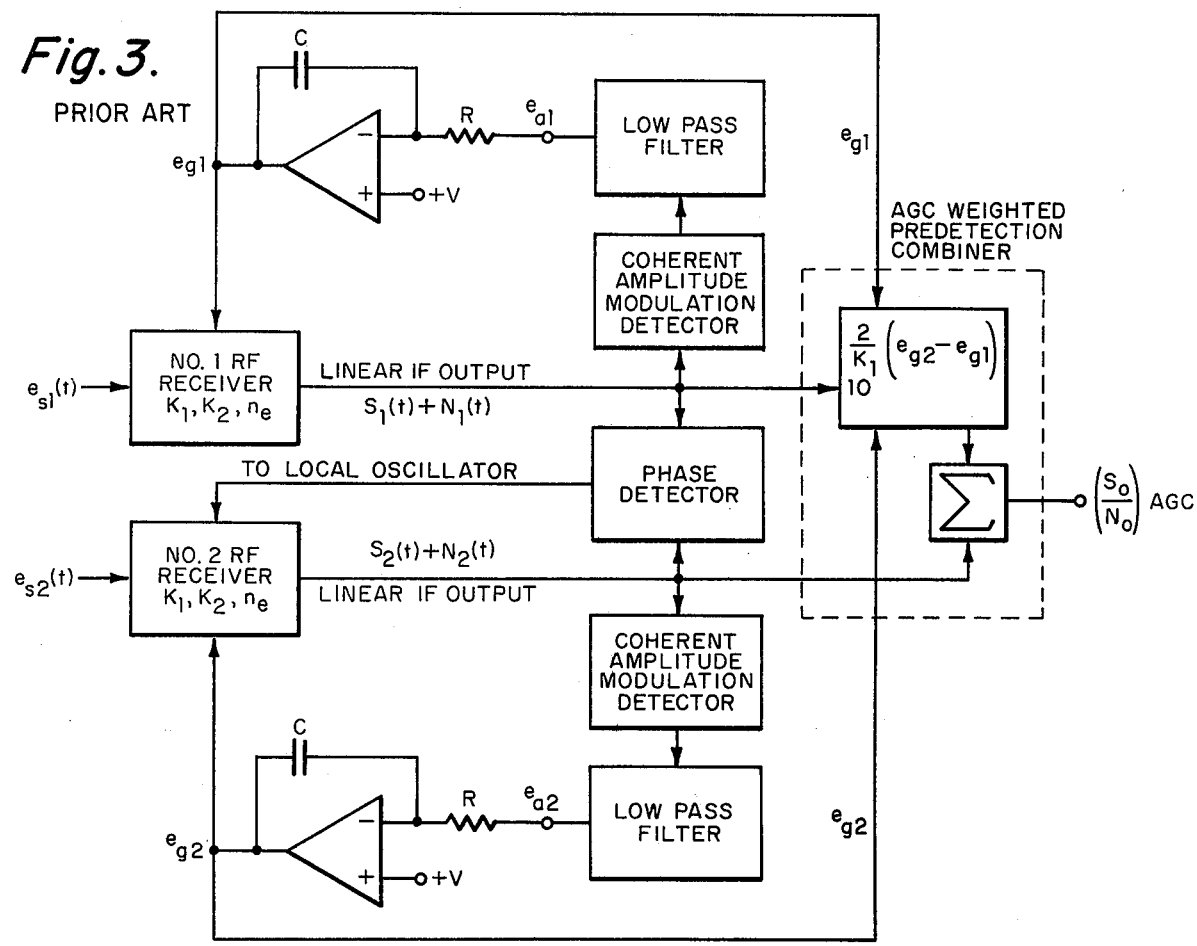
FIG. 3 is a block diagram of a prior art dual-channel AGC weighted predetection combining system.

The block diagram implementation of a dual-channel, AGC weighted, predetection combining system appears in FIG. 3.

Since the plan is to study combiner performance in terms of deterministic input signal envelopes, it is desirable to express the combiner output SNR in terms of the input SNRs. This can be done by use of the relationships between the parameters of a receiver tracking perfectly as follows: First note that the combining ratio $a_R$ can be expressed in terms of the input signals by substituting equation (13) (for each receiver) into equation (16)

$$a_R = \left(\frac{e_{s1}}{e_{s2}}\right)^2 \quad (18)$$

Since $S_1 = S_2$ for receivers tracking perfectly (with $V_1 = V_2$), the ratio of the receiver gains can be expressed in terms of $e_{s1}$ and $e_{s2}$ by use of equation (11)

$$\frac{G_1}{G_2} = \frac{e_{s2}}{e_{s1}} \quad (19)$$

By substituting equations (11), (12), (18), and (19) into equation (5), the desired combiner output SNR is obtained $$\left(\frac{S}{N}\right)_{MAX} = \sqrt{\left(\frac{e_{s1}}{n_e}\right)^2 + \left(\frac{e_{s2}}{n_e}\right)^2} \quad (20)$$

By comparing equation (20) with equation (4), it is seen that equation (20) gives the maximum SNR as it should. Equation (20) gives the output SNR of any dual-channel, maximal-ratio combiner and is independent of the method by which the weighting of the input signals is achieved. For an AGC weighted combiner, the optimum performance is achieved only when the AGC loop is tracking the input signal envelope perfectly (such as to maintain the output signal level constant). For a receiver tracking perfectly, it is seen from equation (14) that a diversity selector which chooses the output of the receiver with the greater (absolute value) AGC voltage will constitute an optimum selector.

B. AGC System Behavior and Predicted Combiner Performance Not Assuming Perfect AGC Tracking The relationships derived in the previous section assumed that the AGC loop was tracking the input signal strength $e_s$ without error such as to maintain the output signal level S (or $e_a$) constant. This restriction will now be removed and the behavior of the AGC loop and performance of the AGC weighted combiner will be considered under dynamic conditions. That is, under conditions where the input $e_s$ is changing at a rate too fast for the AGC loop to follow, thus resulting in dynamic behavior of the output $e_a$.

The differential equation, not derived here, relating the AGC voltage $e_g$ to the rms input signal strength $e_s$ is $$\frac{de_g}{dt} = \frac{V}{RC}\left(1 - K_2 \, 10^{\left(\frac{e_g}{K_1}\right)} e_s\right) \quad (21)$$

where the parameters have been defined. (See FIG. 2 for the block diagram of the AGC loop.) It can also be established that the receiver gain is given by $$G = K_2' V \, 10^{(e_g/K_1)} \quad (22)$$

where $$K_2' = \left(\frac{\pi}{2\sqrt{2}}\right) K_2 \quad (22a)$$

and where the constant $$\left(\frac{\pi}{2\sqrt{2}}\right)$$

is the ratio of rms to average absolute value of a sinusoid. Equation (22) shows the gain to be a function of the AGC voltage $e_g$ and the constants $K_1$, $K_2$, and V. Since the IF filter and LPF (following the AM detector) are assumed to pass the fading envelope without distortion, the AM detector output $e_a$ can be expressed as the product of the receiver gain and rms input signal (see appendix A)

$$e_a = K_2 V \, 10^{(e_g/K_1)} e_s \quad (23)$$

Likewise by use of equation (22) the local rms value S of the linear IF output S($t$) can be expressed by $$S = K_2' V \, 10^{(e_g/K_1)} \quad (24)$$

where $e_s$ is defined as the local rms of the RF input signal $e_s(t)$. The rms output noise can be expressed by $$N = K_2' V \, 10^{(e_g/K_1)} n_e \quad (25)$$

Note that equation (21) is a nonlinear differential equation and in general a closed form solution cannot be found. The data presented is obtained by a numerical solution of equation (21) with an assumed input fading envelope $e_s$ (deterministic function of time).

The AGC voltage is calculated at 200 points for each fading cycle and used with the equations derived below to calculate the combiner output SNRs. The numerical approximation used is a fourth-order Runge-Kutta.

As explained previously, existing AGC weighted combiners are implemented with the combining ratio appearing in equation (17) and such combiners are optimum (maximal-ratio) only when the AGC loop can perfectly track the input fading envelope $e_s$. Under these conditions, the output SNR will be maximized and given by equation (20). An expression for the actual output SNR of a dual-channel AGC weighted predetection combiner, which applies under all conditions, can be obtained by substituting equations (17), (24), and (25) into equation (5), $$\left(\frac{S_o}{N_o}\right)_{AGC} = \frac{\left(\frac{e_{s1}}{n_e}\right) 10^{\frac{1}{K_1}(e_{v2}-e_{v1})} + \left(\frac{e_{s2}}{n_e}\right)}{\sqrt{10^{\frac{2}{K_1}(e_{v2}-e_{v1})}+1}} \quad (26)$$

For two known input fading envelopes, $e_{s1}$ and $e_{s2}$, the numerical solutions of equation (21) for $e_{v1}$ and $e_{v2}$ can be substituted into equation (26) to obtain the combiner output SNR at each point in the calculations (and therefore essentially at each point in time).

While comparing the AGC weighted combiner with the optimum, it will be useful to include the equal-gain predetection combiner for comparison. The equal-gain combiner maintains the gains of both receivers equal while coherently adding the output linear IF signals without weighting. One possible implementation of this combiner appears in FIG. 4. An expression for the output SNR can be easily obtained in terms of the input SNRs by substituting the equations:

$$\begin{array}{l} S_1 = G\, e_{s1} \\ S_2 = G\, e_{s2} \\ N_1 = N_2 = G\, n_3 \\ a_R = 1 \end{array} \quad (26a)$$

into equation (5)

$$\left(\frac{S_o}{N_o}\right)_{eg} = \frac{1}{\sqrt{2}}\left[\left(\frac{e_{s1}}{n_e}\right) + \left(\frac{e_{s2}}{n_e}\right)\right] \quad (27)$$

The ability to select the better of two diversity signals is often desirable. This may happen when loss of phase lock prevents coherent combining. A selection diversity system which uses the AGC voltage as an indication of signal strength also suffers from the phase delay of the AGC voltage relative to the input signal envelope. A selector which operates on the basis of AGC voltages selects the channel with the greatest (absolute value) AGC voltage. The output SNR of the AGC-based diversity selector will be $$\left(\frac{S_o}{N_o}\right)_{gs} = \begin{cases} \left(\frac{e_{s1}}{n_e}\right) & \text{if } |e_{v1}| > |e_{v2}| \\ \left(\frac{e_{s2}}{n_e}\right) & \text{if } |e_{v2}| > |e_{v1}| \end{cases} \quad (28)$$

where the output SNR has been expressed in terms of the input SNR by use of equation (13). The AGC voltage based selector will not make the correct choice part of the time because of the delay between the input signal strengths and AGC voltages. The output SNR of the optimum selector can be described by the following equation $$\left(\frac{S_o}{N_o}\right)_{os} = \begin{cases} \left(\frac{e_{s1}}{n_e}\right) & \text{if } e_{s1} > e_{s2} \\ \left(\frac{e_{s2}}{n_e}\right) & \text{if } e_{s2} > e_{s1} \end{cases} \quad (29)$$

The AGC time constant defines the response time of the AGC loop of an RF receiver. It is defined by most receiver manufacturers as the time for the AGC voltage to change from 10 percent to 90 percent of the difference between its initial and final values for a 6-dB step increase (attack) in the input signal strength. For an arbitrary input $e_s$, the response $e_g$ of the nonlinear differential equation (21) cannot be expressed in closed analytical form. However, for a step change in $e_s$, it is possible to obtain an equation relating AGC voltage $e_g$ and time $t$. In this equation $e_g$ can be expressed only as an implicit function of time. However, it happens that time can be expressed as an explicit function of $e_g$. This is fortunate, in that it provides a means for obtaining an analytical expression for the AGC time constant in terms of initial and final values of $e_s$ and the relevant parameters of the receiver and AGC integrator. The AGC time constant can be expressed as $$\tau_g = \frac{K_1 RC}{V} \log\left[\frac{\left(\frac{e_{si}}{e_{sf}}\right)^{0.9} - 1}{\left(\frac{e_{si}}{e_{sf}}\right)^{0.1} - 1}\right] \quad (30)$$

where
$\tau_g$ = AGC time constant
$e_{si}$ = initial value of input signal strength $e_s$ before step change
$e_{sf}$ = final value of input signal strength $e_s$ after step change III. PERFORMANCE OF AUTOMATIC GAIN CONTROL (AGC) WEIGHTED COMBINERS AND SELECTORS The optimum combining ratio for a dual-channel combining system is given by equation (7) (repeated for convenience).

$$a_R = \frac{\left(\frac{S_1}{N_1^2}\right)^2}{\left(\frac{S_2}{N_2^2}\right)^2} = \left(\frac{S_1}{S_2}\right)\left(\frac{N_2}{N_1}\right)^2 \quad (7)$$

Existing AGC weighted combiners are implemented on the assumption that the AGC loops are tracking the RF fading envelopes perfectly (i.e., $S_1 = S_2$). This assumption reduces the optimum combining ratio to $$a_R = 10^{2/K(e_{v2}-e_{v1})} \quad (17)$$

When the AGC loop is not tracking the fade rates perfectly (i.e., $S_1 \neq S_2$), the ratio of the rms output signals $S_1/S_2$) must also be considered for optimum weighting of the combiner. The ratio of the mean-squared noises is given by equation (17) with or without perfect tracking since the receiver noise is a function of AGC voltage only. The signal values ($S_1$ and $S_2$) appearing in equation (7) are expressed in terms of rms. The presence of the squaring operation (in obtaining the rms of the signal) makes it difficult in the presence of noise to obtain voltages proportional to the rms of the receiver output signals $S_1(t)$ and $S_2(t)$. With noise superimposed on the output signals, the squaring operation contributes DC error components. The ratio of the rms signals ($S_1/S_2$), however, can be replaced by the ratio of the coherent AM outputs ($e_{a1}/e_{a2}$)

$$\left(\frac{S_1}{S_2}\right) = \left(\frac{e_{a1}}{e_{a2}}\right) \qquad (38)$$

for the following two reasons. First, for a sinusoidal carrier there is a fixed relationship between the coherent AM (full wave assumed) output and the rms of the receiver IF output $$\frac{e_a}{S} = \frac{\left(\frac{2}{\pi}\right)(\text{Peak})}{\left(\frac{1}{\sqrt{2}}\right)(\text{Peak})} = \frac{2\sqrt{2}}{\pi} \qquad (39)$$

Second, the coherent AM output does not have a DC error component in the presence of noise; this can be shown as follows. The output of a fullwave coherent AM detector can be described by $$e_a = \frac{1}{nT_i} \int_t^{t+nT_i} W(t)[S(t) + N(t)]\, dt \qquad (40)$$

where the function $W(t)$ is the signum of $S(t)$ which can be expressed by $$W(t) = \begin{cases} +1, & S(t) > 0 \\ -1, & S(t) < 0 \end{cases} \qquad (41)$$

Equation (40) can be expanded to give $$e_a = \frac{1}{nT_i}\int_t^{t+nT_i} W(t)S(t)d(t) + \frac{1}{nT_i}\int_t^{t+nT_i} W(t)N(t)\, dt \qquad (42)$$

From the definition of $W(t)$, it is seen that the first term on the right of equation (42) is the average absolute value of the signal $S(t)$ $$e_a = \frac{1}{nT_i}\int_t^{t+nT_i} W(t)S(t)\, dt = \frac{1}{nT_i}\int_t^{t+nT_i} |S(t)|\, dt \qquad (43)$$

Since the receiver output noise $N(t)$ has a mean value of zero, the second term on the right side of equation (42) is a random noise voltage with a mean value of zero. The magnitude of this perturbation noise term will be inversely related to the averaging time $nT$, which in turn will be inversely related to the bandwidth of the LPF at the output of the coherent AM detector (see FIG. 2).

By substituting equation (17) and equation (38) into equation (7), an expression for the optimum (maximal-ratio) combining ratio in terms of the AGC voltages and coherent AM output voltages is obtained $$a_R \left(\frac{e_{a1}}{e_{a2}}\right) 10^{\frac{2}{K_1}(e_{a2}-e_{a1})} \qquad (44)$$

which applies for both tracking and nontracking conditions. Note that when $e_{a1} = e_{a2}$ (for perfect tracking), equation (44) reduces to equation (17), as would be expected. Equation (44) thus defines the implementation of a maximal-ratio combiner using both the AGC and AM voltages from the receiver. The combining ratio $a_R$ will remain optimum provided that the receiver IF bandwidth and low pass filter bandwidth (following the AM detector) are sufficiently wide to pass the RF fading envelope. The LPF will generally be narrower than the IF bandwidth and will be determined by a tradeoff between fade rate tracking ability and perturbation noise on the weighting signals. It is also interesting to note that the fade rate tracking ability of the combiner is independent of the AGC time constant $\tau_g$, when both the AM and AGC voltages are used in the weighting function (this assumes that the linear IF output amplifier is not limiting-shorter $\tau_g$ may help in this respect).

A. AM/AGC Weighted Combiner

Several configurations and applications are possible based upon the implementation suggested by equation (44). One application of particular interest is the modification of the weighting signals of a conventional AGC weighted combiner to overcome the limitations in tracking ability. This can best be seen by writing the ratio of the AM signals in an exponential-logarithmic form as follows $$\left(\frac{e_{a1}}{e_{a2}}\right) = \frac{\left(\frac{e_{a1}}{V}\right)}{\left(\frac{e_{a2}}{V}\right)} = 10^{\log\left[\frac{\left(\frac{e_{a1}}{V}\right)}{\left(\frac{e_{a2}}{V}\right)}\right]} = 10^{\frac{2}{K_1}\left[\left(\frac{K_1}{2}\right)\log\left(\frac{e_{a1}}{V}\right) - \left(\frac{K_1}{2}\right)\log\left(\frac{e_{a2}}{V}\right)\right]} \qquad (45)$$

When equation (45) is substituted into equation (44) and the terms are properly arranged, the dual-channel combining ratio can be expressed in the form $$a_R = 10^{\frac{2}{K_1}\left\{\left[e_{a2} - \frac{K_1}{2}\log\left(\frac{e_{a2}}{V}\right)\right] - \left[e_{a1} - \frac{K_1}{2}\log\left(\frac{e_{a1}}{V}\right)\right]\right\}} \qquad (46)$$

Note that the logarithmic correction term reduces to zero when $e_a = V$ (i.e., when the AGC is tracking the RF input perfectly).

Figure 7:
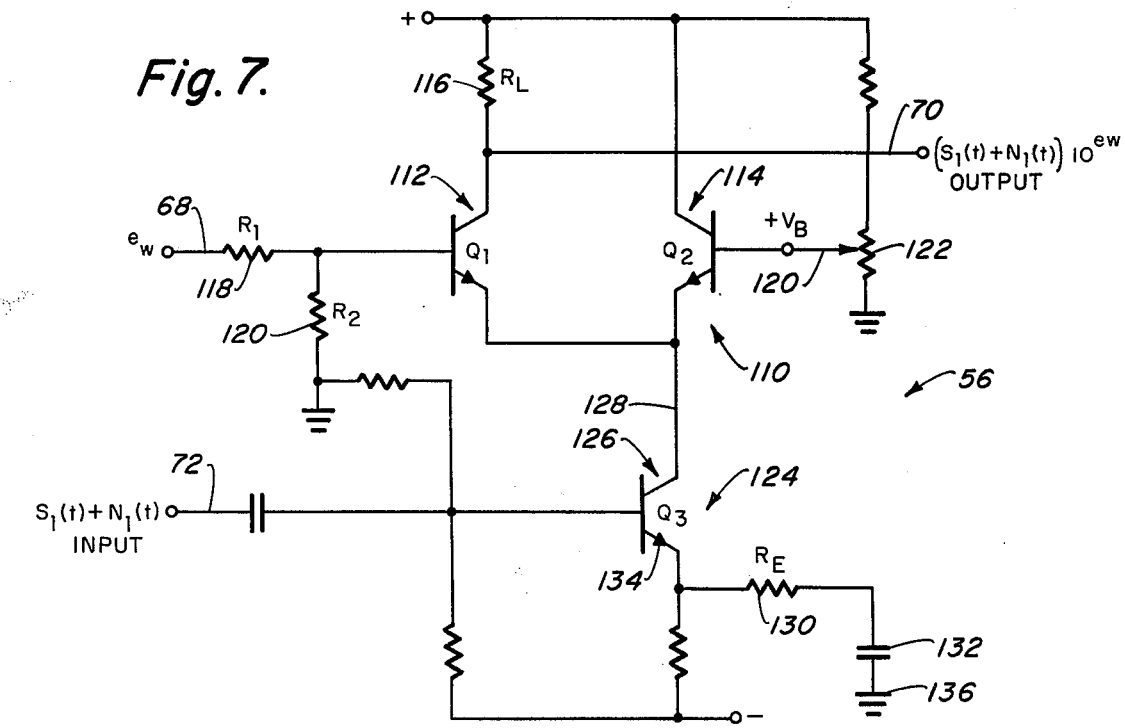
FIG. 7 is a schematic of part of the circuit illustrated in FIG. 5.
Figure 5:
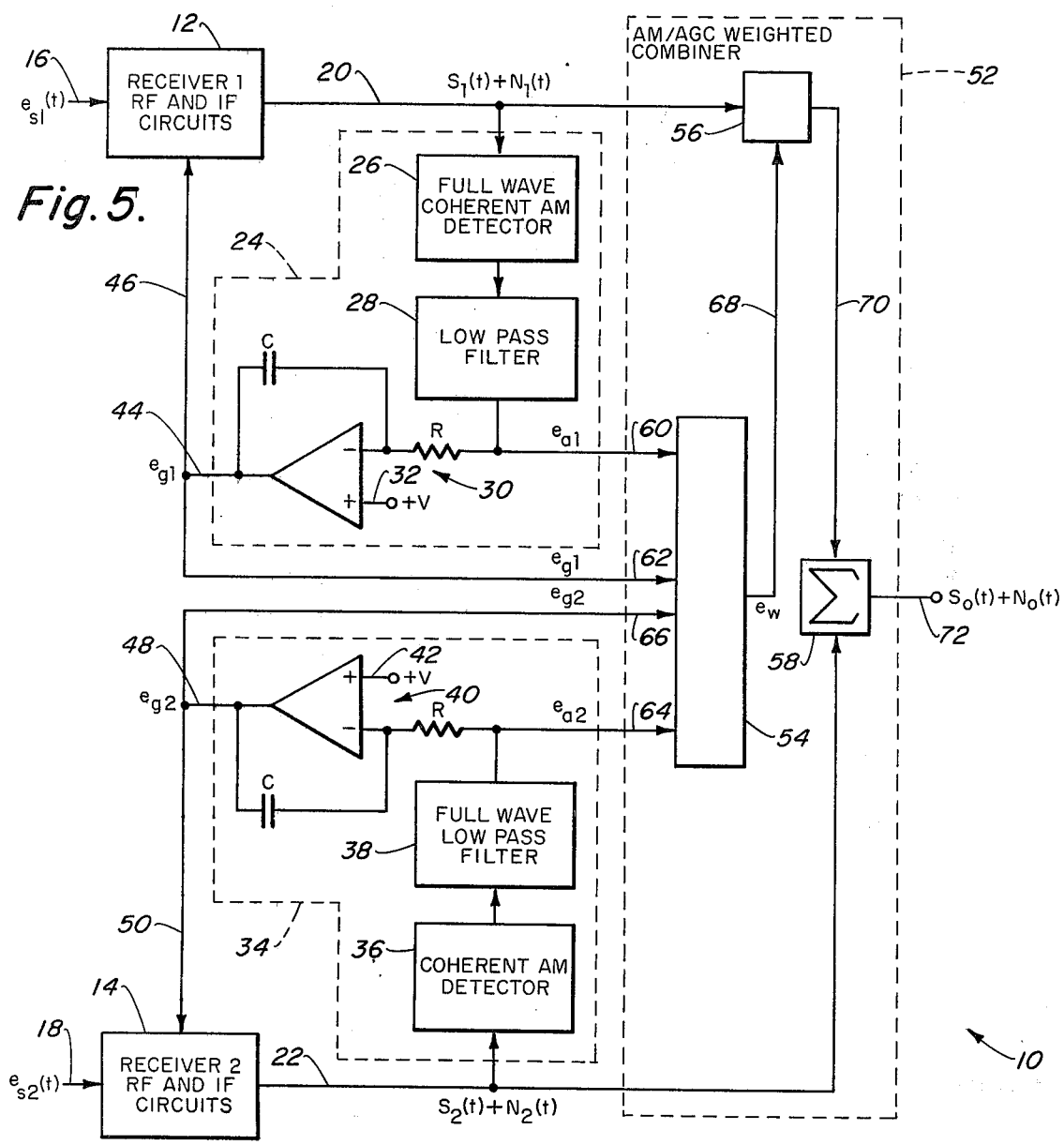
FIG. 5 is a block diagram of an AM/AGC weighted combiner and receiving circuits.
Figure 6:
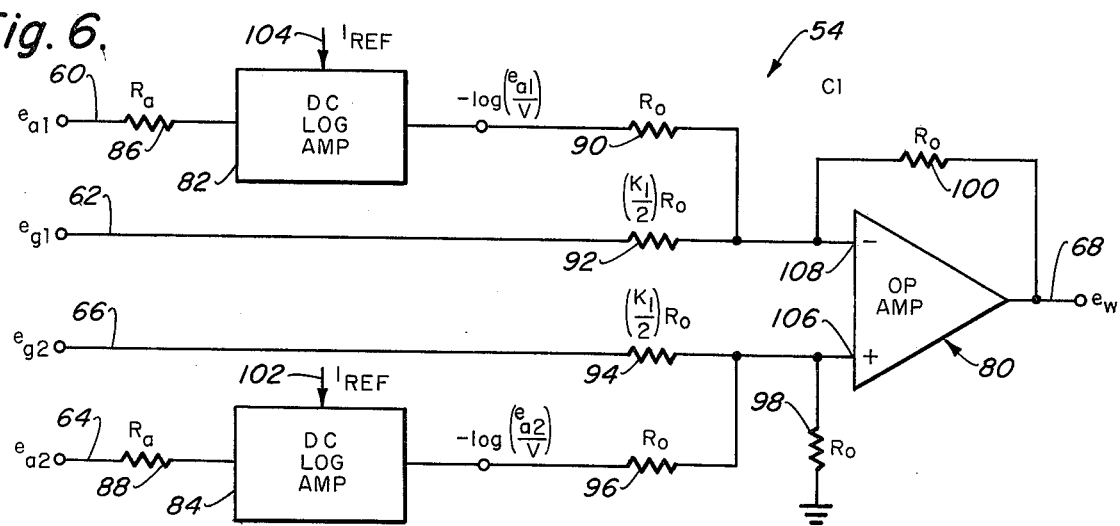
FIG. 6 is a schematic of part of the circuit illustrated in FIG. 5.

Turning to FIGS. 5, 6 and 7, an AM/AGC weighted combiner and receiver circuit 10 is illustrated utilizing the weighting factor or combining ratio derived in equation (46).

Receivers 12 and 14 include the appropriate radio frequency (RF) and intermediate frequency (IF) amplifier circuits customarily found in such receivers.

Receiver 12 receives the diversity input signal or RF voltage $e_{s1}(t)$ on line 16 and receiver 14 receives the diversity input signal or RF voltage $e_{s2}(t)$ on line 18. After amplification, receivers 12 and 14 output received signals $e_{s1}(t)$ and $e_{s2}(t)$ on lines 20 and 22, respectively.

Associated with receiver 12 is automatic gain control (AGC) circuit 24. AGC circuit 24 is comprised of coherent amplitude-modulation (AM) detector 26, low pass filter 28, and AGC integrator 30. Bias voltage V inputs AGC integrator 30 on line 32.

Associated with receiver 14 is automatic gain control circuit 34. AGC circuit 34 is comprised of coherent amplitude modulation detector 36, low pass filter 38, and AGC integrator 40. Bias voltage V inputs AGC integrator 40 on line 42. It is noted that the AGC bias voltage on lines 32 and 42 are substantially identical direct-current voltages.

The AGC voltage $e_{g1}$ on line 44 is feedback to gain control circuits in the RF and IF amplifiers of receiver 12 via line 46. The AGC voltage $e_{g2}$ on line 48 is feedback to gain control circuits in the RF and IF amplifiers of receiver 14 via line 50.

AM/AGC weighted combiner 52 is comprised of exponent circuit 54, combining ratio circuit 56, and summing circuit 58. FIG. 6 represents one implementation of exponent circuit 54 while FIG. 7 represents one implementation of combining ratio circuit 56. AM voltage $e_{a1}$ and AGC voltage $e_{g1}$ from AGC circuit 24 inputs exponent circuit 54 via lines 60 and 62, respectively. AM voltage $e_{a2}$ and AGC voltage $e_{g2}$ from AGC circuit 34 inputs exponent circuit 54 via lines 64 and 66, respectively.

Exponent signal $e_w$ appears on line 68 which inputs combining ratio circuit 56. Exponent signal $e_w$ appearing on line 68 is an electronic voltage signal given by the relationship $$e_w = \frac{2}{k_1}(e_{g2} - e_{g1}) + \log\left(\frac{e_{a1}}{V}\right) - \log\left(\frac{e_{a2}}{V}\right) \quad (48)$$

where
- $K_1$ is a constant associated with receiver 12 and receiver 14
- $e_{g2}$ is the AGC voltage appearing on line 66
- $e_{g1}$ is the AGC voltage appearing on line 62
- $e_{a1}$ is the AM voltage appearing on line 60
- $e_{a2}$ is the AM voltage appearing on line 64
- $V$ is the AGC bias voltage appearing on lines 32 and 42.

Combining ratio circuit 56 outputs an electronic voltage signal on line 70 given by the relationship $$e_{70} = [S_1(t) + N_1(t)] \, 10^{e_w} \quad (50)$$

where $S_1(t) + N_1(t)$ is the received signal on line 20 which inputs combining ratio circuit 56 on line 20.

Summing circuit 58 linearly sums the signals appearing on lines 70 and 22. This sum appears on line 72 which is the output of AM/AGC weighted combiner 52.

Now turning to FIG. 6, one implementation of exponent circuit 54 is illustrated. Exponent circuit 54 is comprised of three active components operational amplifier 80 and direct-current logarithmic amplifiers 82 and 84 as well as resisters 86 through 100.

The value of resistors 86 and 88 are determined by the relationship $$R_a = V/I_{ref} \quad (52)$$

where $V$ is the AGC bias voltage on lines 32 and 42 of FIG. 5 and $I_{ref}$ is the reference current supplied to logarithmic amplifiers 82 and 84 via lines 102 and 104. It is noted that $I_{ref}$ may be generated internal to logarithmic amplifiers 82 and 84.

Operational amplifier 80 performs the summation indicated in equation 48 by summing at both positive input 106 and negative input 108. As will be appreciated by those having ordinary skill in the art, the exponent signal appearing on line 68 is given by equation 48.

Now turning to FIG. 7, one implementation of combining ratio circuit 56 of FIG. 6 is illustrated. A common emitter differential amplifier 110 is comprised of transistor 112, transistor 114, load resistor ($R_L$) 116 and input resistors 118 and 120. Positive bias voltage $V_B$ appears on line 120 and is adjustable via potentiometer 122.

An common-emitter circuit 124 is comprised of transistor 126 whose collector is connected to the common emitter of differential amplifier 110 via line 128. Resistor 130 and capacitor 132 are in series and connected between emitter 134 of transistor 126 and a reference potential 136.

Exponent signal ($e_w$) inputs differential amplifier 110 on line 68 and received signal $S_1(t) + N_1(t)$ inputs common-emitter circuit 124 on line 72.

The nominal gain of combining ratio circuit 56, i.e., for $e_w = 0$, is a function of the positive bias voltage $V_B$ on line 120 and the ratio of resistor 116 $R_L$ over resistor 130 $R_e$. When the positive bias voltage $V_B$ on line 120 is properly adjusted relative to the significant dynamic range of the exponent signal $e_w$ on line 68, the IF gain is approximated by an exponential function of the exponent signal $e_w$ on line 68. With positive bias voltage $V_B$ on line 120 appropriately set, the exponential function will assume the form of equation (46), i.e., with all constants of proportionality equal to unity, when the resistors 116, 130, 118, and 120 are determined by the following relationships $$\frac{R_L}{R_e} = 1 + 10^{\left(\frac{V_B}{K}\right)} \quad (54)$$

where
- $R_L$ is resistor 116
- $R_e$ is resistor 130 and
- $V_B$ is the positive bias voltage appearing on line 120 and $$\frac{R_2}{R_1 + R_2} = K \quad (56)$$

where
- $R_2$ is resistor 120 and
- $R_1$ is resistor 118 and $$K = \frac{kT}{q \log e} \quad (58)$$

where
- $k$ is Boltzmann's constant
- $T$ is the absolute temperature (degrees Kelvin)

$q$ is the electron charge
$e$ is 2.71828 — (base of natural logarithm) and
log is logarithm to base 10

Since resistor $118^{R_1}$ normally large compared to $120^{R_2}$, the variation of K with temperature can be compensated by choosing resistor $118^{R_1}$ with the appropriate temperature coefficient. Further details on component selection are not given since circuit 56 is essentially a standard IF amplifier stage. The output of circuit 56 is on line 70 which inputs summing circuit 58 via line 70.

B. AM Weighted Combiner with Common AGC System

Figure 8:
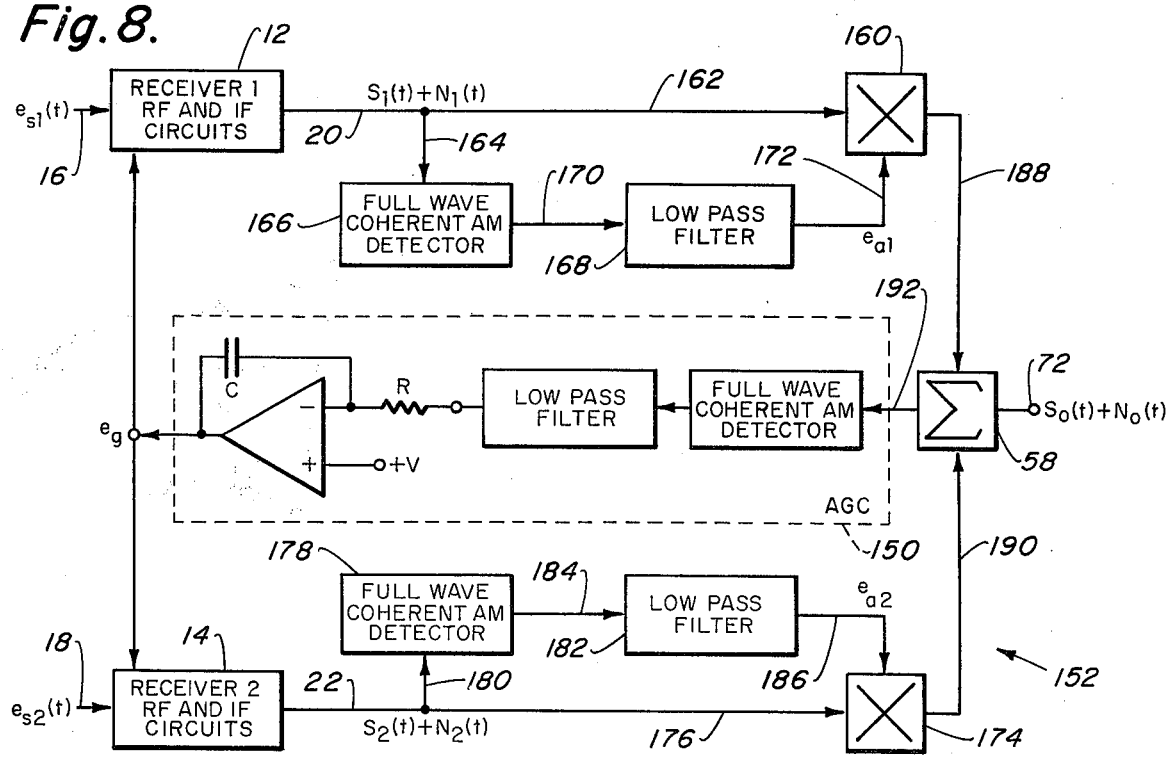
FIG. 8 is a block diagram of an AM weighted combiner with a common AGC system.

Now turning to FIG. 8, a common automatic gain control circuit 150 is utilized to form an AM weighted combiner 152. The optimum combining ratio or weighting factor is given by equation (44). However, when the AGC voltages $e_{g1}$ and $e_{g2}$ are equal, as is the case of the AM weighted combiner 152 of FIG. 8, the optimum combining ratio reduces to $$a_r = \frac{e_{a1}}{e_{a2}} \qquad (59)$$

then the optimum combining ratio becomes a function of the AM voltages $e_{a1}$ and $e_{a2}$ only.

Receivers 12 and 14 receive RF voltage signals $e_{s1}(t)$ and $e_{s2}(t)$ via lines 16 and 18 respectively.

The received signal on line 20 inputs mixer 160 via line 162 and coherent, amplitude-modulation detector 166 via line 164. Low pass filter 168 receives the detected signal on line 170. Mixer 160 receives the filtered signal via line 172. The filtered signal on line 172 is an AM voltage $e_{a1}$.

The received signal on line 22 inputs mixer 174 via line 176 and coherent, amplitude-modulation detector 178 via line 180. Low pass filter 182 receives the detected signal on line 184. Mixer 174 receives the filtered signal on line 186. The filtered signal on line 186 is an AM voltage $e_{a2}$.

Mixers 160 and 174 are the weighting circuits. Mixers 160 and 174 are multipliers or double balanced modulators which operate as linear amplifiers for the IF signals with the gains directly proportional to the weighting signals $e_{a1}$ and $e_{a2}$ on lines 172 and 186, respectively.

The weighted signals on lines 188 and 190 input summing circuit 58. Summing circuit sums these two weighted signals on lines 72 and 192. Line 72 is the output of the AM weighted combiner and line 192 supplies the necessary feedback signal to common AGC circuit 150.

Note in the circuit of FIG. 8 the AM voltages $e_{a1}$ and $e_{a2}$ on lines 172 and 186 are applied separately to separate mixers 160 and 174. The validity of this is established by the following discussion. In general, the weighting coefficients for AM/AGC weighted combiners as shown in FIG. 1 are $$a_j = \frac{S_j}{N_j^2} = \frac{\frac{e_{aj}}{2}}{10^{\frac{e_{gj}}{K_1}}} \qquad (60)$$

where $a_j$ is the weighting coefficient of the $j$th
$S_j$ is the local rms signal voltage of the $j$th diversity channel
$N_j^2$ is the mean square noise voltage of the $j$th diversity channel
$e_{aj}$ is the local output of a fullwave coherent AM detector preceding an AGC integrator of the $j$th diversity channel
$K_1$ is a receiver constant and
$e_{gj}$ is the AGC voltage of the $j$th diversity channel For common AGC operation, the coefficients in equation (60) reduces to $$a_j = e_{aj} \qquad (62)$$

where
$a_j$ is the weighting coefficient of the $j$th diversity channel, and
$e_{aj}$ is the local output of a fullwave coherent AM detector preceding an AGC integrator of the $j$th diversity channel as can be shown by substituting equation (60) in equation (2).

C. AM/AGC Weighted Selector

Figure 9:
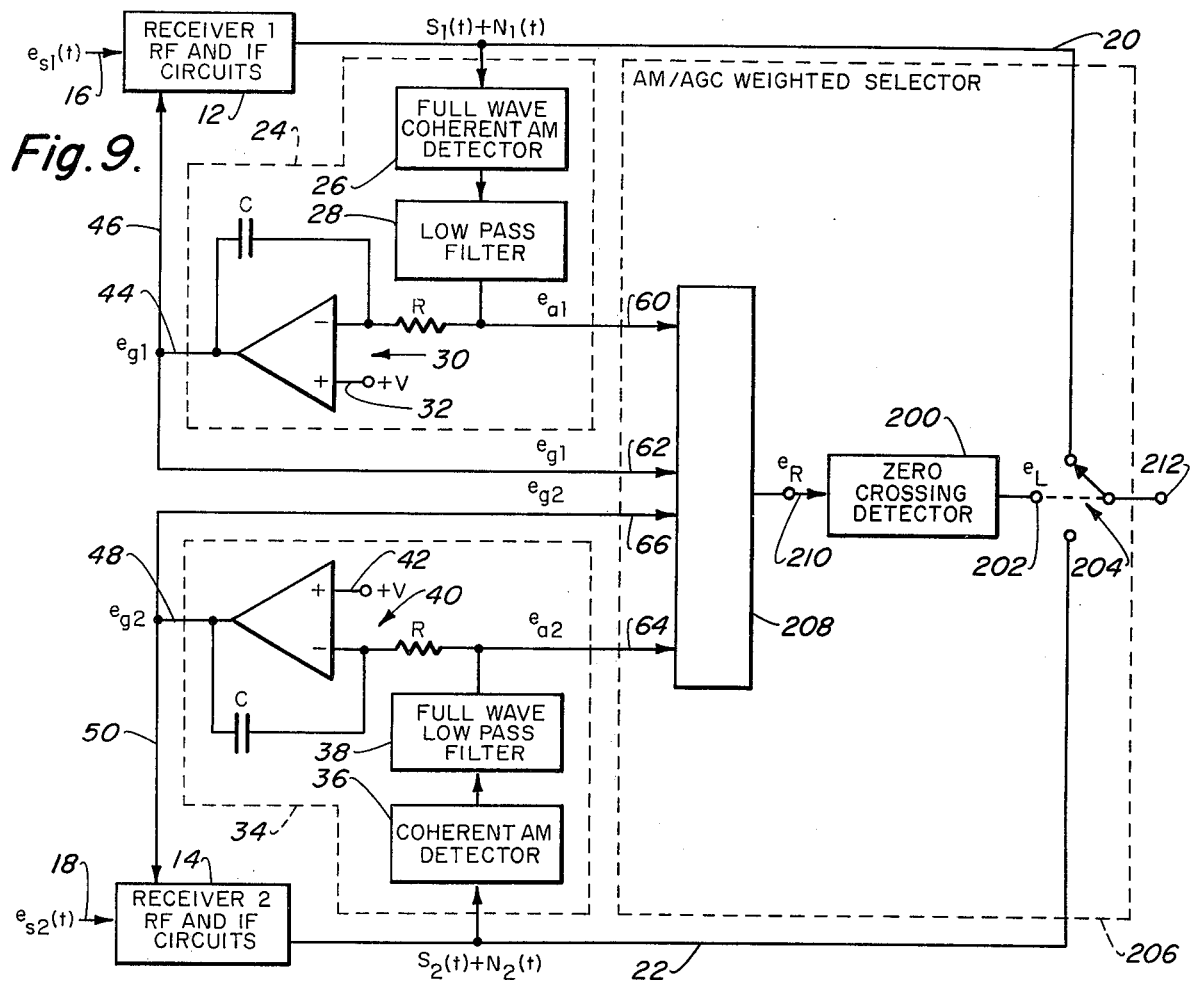
FIG. 9 is a block diagram of an AM/AGC weighted selector.

Now turning to FIG. 9, since a combiner achieves a significant improvement in output SNR only when the received signals on lines 20 and 22 are coherent and have nearly equal SNRs, it is sometimes preferable to simply select the better of the two uncombined signals. Since the output SNR of an RF receiver is directly proportional to the input signal strength (the noise originates in the first gain stages of the receiver), the receiver with the greater input signal strength also has the greater output SNR-matched receivers are assumed.

It can be shown that the diversity input signal $e_{sj}$ strength can be expressed as a function of the AGC voltage $e_{gj}$ and the AM voltage $e_{aj}$. Rearranging equation (22), the following is obtained $$K_2 e_s = \left(\frac{e_a}{V}\right) 10^{-\left(\frac{e_g}{K_1}\right)} \qquad (64)$$

where
$K_1$ and $K_2$ are receiver constants
$e_s$ is the diversity input signal
$e_a$ is the AM voltage
$e_g$ is the AGC voltage, and
$V$ is the AGC bias voltage Equation (64) can be expressed in the following form by taking the logarithm of each side $$\log(K_2 e_s) = \log\left(\frac{e_a}{V}\right) - \frac{e_g}{K_1} \qquad (66)$$

For the two receivers 12 and 14 equation (66) can be expressed in the following form by subtracting the equation for receiver 14 from that for receiver 12.

$$e_R = \log\left(\frac{e_{s1}}{e_{s2}}\right) = \frac{1}{K_1}(e_{g2} - e_{g1}) + \log\left(\frac{e_{a1}}{V}\right) - \log\left(\frac{e_{a2}}{V}\right) \qquad (68)$$

Equation (68) expresses the logarithm of the ratio of the diversity input signal strength of receiver 12 to the diversity input signal strength of receiver 14 as a function of the AGC and AM voltages of the two receivers. Symbol $e_R$ has been assigned to represent this function. The logarithm of the ratio of the diversity input signal strengths will be positive when $e_{s1}$, the signal on line 16, is greater than $e_{s2}$, the signal on line 18, and negative when $e_{s2}$, the signal on line 18, is greater than $e_{s1}$, the signal on line 16. Thus the voltage $e_R$ is a useful signal for selecting the greater of the two diversity input signal strengths. When $e_R$ is applied to a zero crossing detector 200, a voltage comparator with zero reference, the output $202^{eL}$ of zero crossing detector 200 will assume two states such that $$e_L = \begin{matrix} + E, e_{s1} > e_{s2} \\ - E, e_{s2} > e_{s1} \end{matrix} \quad (70)$$

The voltage $e_L$ is used to control the position of an electronic switch 204 to select either the output of receiver 12 if $e_{s1} > e_{s2}$ or the output of receiver 14 if $e_{s2} > e_{s1}$.

FIG. 10 illustrates the implementation of the function $e_r$ of equation (68) and related discussion, supra.

Receivers 12 and 14 and AGC circuits 34 and 24 operate identically as in FIG. 5. Switch 204, zero-crossing detector 200, and circuit 208 comprises selector circuit 206. Circuit 208 generates an electronic voltage signal $e_R$ as given by equation (68) which inputs zero-crossing detector 200 via line 210. The AGC and AM voltages input circuit 208 on lines 60, 62, 64 and 66. The output 212 of switch 204 will be the strongest input diversity signal on lines 16 and 18.

one implementation of circuit 208 is illustrated in greater detail in FIG. 10. Circuit 208 is comprised of three active elements operational amplifier 220, direct-current logarithmic amplifiers 222 and 224, and resistors 226 through 240. The values of resistors 226 and 228 are determined in the same manner as the values of resistors 86 and 88 of FIG. 6. The circuit 208 of FIG. 10 is identical in form and operation to the circuit 54 of FIG. 6 except for the different values of resistors 92 and 94 of FIG. 6 from resistors 232 and 234 of FIG. 10. It will be appreciated by those having ordinary skill in the art that circuit 208 of FIG. 10 implements the function $e_R$ of equation (68).

D. AM/AGC Weighted Combiner-Selector

Now turning to FIG. 11, since it is usually not possible to predict in advance whether the combined or best uncombined signal will give best average performance, it is often desirable to build a system that will output on a single line the better of the two. For example, the phase difference between the received signals on lines 20 and 22 may be too great for combiner 52 to output a meaningful weighted signal on line 72. In that case, it is desirable to select one or the other of the received signals, lines 20 and 22. One method of accomplishing this is shown in FIG. 11 where an AM/AGC weighted combiner/selector is illustrated. Receivers 12 and 14 and related AGC circuits are identical to the ones shown in FIGS. 5 and 9. AM/AGC weighted selector 206 is identical to the one shown in FIGS. 9 and 10. Thus, the signal appearing on line 212 is either the diversity input signal on line 20 or the diversity input signal on line 22, whichever is the stronger.

AM/AGC weighter combiner 52 is identical to the one shown in FIGS. 5 and 6. Thus, the signal appearing on line 72 is the sum of the received signal on line 22 and the received signal on line 20 after weighting.

The received signal on line 20 and the received signal on line 22 input mixer 300 via lines 302 and 304, respectively. Mixer 300 multiplies the two received signals and outputs the product on line 306 which inputs low pass filter 308.

Low pass filter 308 is connected to threshold detector 310 via line 312. The threshold voltage $V_T$ of threshold detector 310 is a predetermined voltage. Line 314 is the output of the circuit shown in FIG. 11.

When the average phase angle between the received signals on lines 20 and 22 exceeds some predetermined value which is established by the threshold voltage $V_T$ of detector 310, switch 316 connects the signal on line 212 to output 314. If the average phase angle between the received signals on lines 20 and 22 do not exceed the threshold voltage $V_T$ of detector 310, switch 316 connects the signal on line 72 to output 314. The voltage $e_p$ on line 312 is proportional to the average phase angle between the received signals on line 20 and 22. The output of mixer 300 on line 306 contains a direct-current component proportional to the cosine of the differential phase angle. When the phase difference is zero, the cosine function has its maximum value. Low pass filter 308 eliminates any undesired sideband components. The output of threshold detector 310 can be described by the following relationship $$e_t = \begin{cases} +E, e_p > V_T & (72) \\ -E, e_p < V_T & (74) \end{cases}$$

The positive of switch 316 can be described by the following relationship $$\text{Switch 316 position} = \begin{matrix} 1, e_T = +E \\ 2, e_T = -E \end{matrix}$$

Thus, the output of threshold detector 310 controls switch 316.

Figure 4:
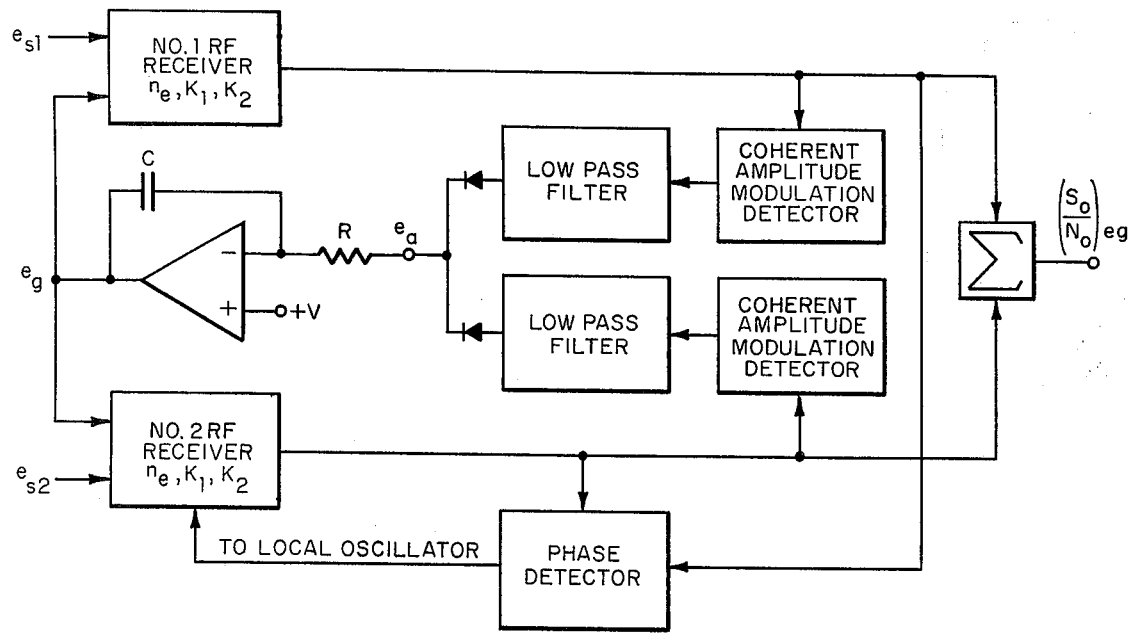
FIG. 4 is a block diagram of a prior art equal-gain predetection combiner.

As will be appreciated by those having ordinary skill in the art, the circuits described in FIGS. 5–11 may contain phase lock loops similar to the phase lock loops shown in FIGS. 3 and 4. Such phase lock loops are so common in the art that to include them in FIGS. 5–11 would merely add nothing to the detailed description.

The following is a list of definitions of symbols appearing supra:

APPENDIX A

| | |
|---|---|
| $a_j$ | Weighting coefficient of the jth channel |
| $a_R$ | Dual-channel combining ratio |
| $B$ | Effective receiver bandwidth |
| $e_a$ | Local output of a fullwave coherent AM detector preceding the AGC integrator |
| $e_g$ | AGC voltage |
| $e_s$ | Local rms voltage of the receiver RF input signal |
| $\bar{e}_s$ | Average of receiver rms input signal over one full fading period (not local average) |
| $e_{sf}$ | Final value of $e_s$ following a step change |
| $e_{si}$ | Initial value of $e_s$ preceding a step change |
| $e_s(t)$ | Instantaneous RF voltage at the receiver input |
| $F$ | Receiver noise figure |
| $f_F$ | Frequency of fades (fade rate) |
| $G$ | Receiver voltage gain |
| $k$ | Boltzmann's constant |

-continued

| | |
|---|---|
| $K_1$ | Receiver constant [defined by equation (8)] |
| $K_2$ | Receiver constant [defined by equation (8)] |
| $K_2'$ | Defined in appendix A |
| $n_e$ | Effective receiver rms input noise voltage |
| $N_j$ | Local rms noise voltage of the jth diversity channel |
| $N_j^2$ | Mean square noise voltage of the jth diversity channel |
| $N_j(t)$ | Instantaneous noise voltage of the jth diversity channel |
| $N_o$ | Local rms noise voltage at the combiner output |
| $N_o(t)$ | Instantaneous noise voltage at the combiner output |
| RC | Time constant of the AGC integrator |
| $S_j$ | Local rms signal voltage of the jth diversity channel |
| $S_j(t)$ | Instantaneous signal voltage of the jth diversity channel |
| $\frac{S_j}{N_j}$ | Signal-to-noise ratio of the jth diversity channel |
| $S_o$ | Local rms signal voltage at the combiner output |
| $S_o(t)$ | Instantaneous signal voltage at the combiner output |
| $\frac{S_o}{N_o}$ | Signal-to-noise ratio at the combiner output |
| $\left(\frac{S_o}{N_o}\right)_{AGC}$ | Output SNR of an AGC weighted combiner |
| $\left(\frac{S_o}{N_o}\right)_{eg}$ | Output SNR of an equal-gain combiner |
| $\left(\frac{S_o}{N_o}\right)_{as}$ | Output SNR of an AGC voltage-based diversity selector |
| $\left(\frac{S_o}{N_o}\right)_{MAX}$ | Output SNR of a maximal-ratio combiner |
| $\left(\frac{S_o}{N_o}\right)_{os}$ | Output SNR of an optimum diversity selector |
| T | Absolute temperature in degrees Kelvin or the period of a periodic signal |
| $T_1$ | Local period of the Rf or IF signal |
| W(t) | Signum of $s(t)$ |
| $\tau_a$ | AGC time constant |

It will be appreciated by those skilled in the art that the complete circuit diagrams of FIGS. 1–11 include such suitable and necessary biasing voltage sources as are usually provided in such circuits. All such biasing is not shown in FIGS. 1–11.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. In combination with a first and second receiver each having an automatic gain control circuit, each said automatic gain control circuit comprising a full-wave, coherent AM detector, a low pass filter, and an AGC integrator circuit, said AM detector being connected between said receiver and said low pass filter, said low pass filter being connected between said AM detector and said AGC integrator circuit, said AGC integrator circuit being connected between said low pass filter and said receiver, the signal from said low pass filter to said AGC integrator circuit being an amplitude modulated (AM) voltage which is a filtered, full-wave, coherent, AM detected signal, the signal from said AGC integrator circuit to said receiver being an automatic gain control (AGC) voltage, said AGC integrator circuit also being supplied with a direct current AGC bias voltage from an AGC bias voltage source, said AGC bias voltages being identical for both automatic gain control circuits; a predetection, weighted diversity combiner for combining a first and second received signal from said first and second receiver so as to maximize the signal-to-noise ratio of the received signals comprising:

a. first circuit means receiving said AM and AGC voltages and said first received signal for weighting said first received signal with a combining ratio that is a function of said AM and AGC voltages, said first circuit means having an output; and b. summing circuit means having an output for summing said weighted first received signal and said second received signal, said output being said combiner output.

2. The apparatus of claim 1 wherein said first circuit means comprises:

a. second circuit means for generating an exponent signal that is a function of said AM and AGC voltages;

b. third circuit means receiving said exponent signal and said first received signal for multiplying said first received signal by ten to the exponent signal to generate a multiplied signal, said third circuit means having an output upon which said multiplied signal appears, said multiplied signal being said first received signal weighted with said combining ratio.

3. The apparatus of claim 2 wherein said exponent signal ($e_w$) is represented by the following relationship:

$$e_w = \frac{2}{k_1}(e_{a2} - e_{a1}) + \log\left(\frac{e_{a1}}{V}\right) - \log\left(\frac{e_{a2}}{V}\right) \quad (48)$$

where $K_1$ is a constant defined by said first and second receiver parameters
 $e_{g1}$ is the AGC voltage from said first receiver
 $e_{g2}$ is the AGC voltage from said second receiver
 $e_{a1}$ is the AM voltage from said first receiver
 $e_{a2}$ is the AM voltage from said second receiver
 V is the AGC bias voltage from said first and second receiver, said AGC bias voltage being substantially identical for both receivers.

4. The apparatus of claim 3 wherein said multiplied signal ($e_m$) is represented by the following relationship
$e_m = [S_1(t) + N_1(t)] \, 10^{e_w}$
where $S_1(t) + N_1(t)$ is the received signal from said first receiver
 $e_w$ is the exponent signal.

5. The apparatus of claim 2 wherein said second circuit means comprises:

a. a first direct-current logarithmic amplifier having an input and an output;
b. a second direct-current logarithmic amplifier having an input and an output;
c. an operational amplifier having a positive input, a negative input, and an output, said exponent signal appearing on said operational amplifier output;
d. a first resistor connected between said output of said first logarithmic amplifier and said negative input of said operational amplifier;
e. a second resistor connected between said negative input of said operational amplifier and said AGC voltage of said first receiver;
f. a third resistor connected between said positive input of said operational amplifier and said AGC voltage of said second receiver;
g. a fourth resistor connected between said output of said second logarithmic amplifier and said positive input of said operational amplifier;
h. a fifth resistor connected between said output of said operational amplifier and said negative input of said operational amplifier;
i. a sixth resistor connected between said input to said first logarithmic amplifier and said AM voltage of said first receiver;
j. a seventh resistor connected between said input to said second logarithmic amplifier and said AM voltage of said second receiver; and
k. an eighth resistor connected between the positive input of said operational amplifier and a reference voltage.

6. Thee apparatus of claim 5 wherein the value of sixth and seventh resistors ($R_{6,7}$) is given by the relationship $$R_{6,7} = V/I_r$$

where
$V$ is the AGC bias voltage from said first and second receiver, said AGC bias voltage being substantially identical for both receivers
$I_r$ is a reference current generated internally or externally to said first and second logarithmic amplifier.

7. The apparatus of claim 2 wherein said third circuit, means comprises:
a. a differential amplifier circuit having common emitters, said differential amplifier circuit being inputed by said exponent signal; and
b. a common emitter circuit having a collector connected to said common emitters of said differential amplifier circuit, said common emitter circuit being inputed by said first received signal.

8. The apparatus of claim 7 wherein said differential amplifier circuit comprises:
a. a first transistor having a base, an emitter and a collector;
b. a second transistor having a base, an emitter, and a collector, said first and second transistor being substantially identical, said second transistor base being connected to a first bias voltage, said second transistor emitter being connected to said first transistor emitter, said second transistor collector being connected to a second bias voltage;
c. a first resistor connected between the base of said first transistor and said exponent signal;
d. a second resistor connected between the base of said first transistor and a reference voltage; and
e. a third resistor connected between the collector of said first transistor and a second bias voltage, said collector of said first transistor being the output of said first circuit means.

9. The apparatus of claim 8 wherein said common emitter circuit includes:
a. a third transistor having an emiter, a collector, and a base, said third transistor collector being connected to said first and second transistor emitters, said third transistor base being connected to receive said first received signal;
b. a capacitor having a first and a second side, said first side being connected to a reference voltage; and
c. a fourth resistor being connected between said third transistor emitter and said second side of said capacitor.

10. The apparatus of claim 9 wherein the values of said first ($R_1$), second ($R_2$), third ($R_L$) and fourth ($R_E$) resistors are given by the following relationships $$\frac{R_L}{R_E} = 1 + 10^{\left(\frac{-V_B}{K}\right)}$$

and $$K = \frac{R_2}{R_1 + R_2}$$

where
$K$ is a constant associated with said differential amplifier circuit
$V_B$ is said first bias voltage.

11. In combination with a first and second receiver each having an automatic gain control circuit, each said automatic gain control circuit comprising a full-wave, coherent AM detector, a low pass filter, and an AGC integrator circuit, said AM detector being connected between said receiver and said low pass filter, said low pass filter being connected between said AM detector and said AGC integrator circuit, said AGC integrator circuit being connected between said low pass filter and said receiver, the signal from said low pass filter to said AGC integrator circuit being an amplitude modulated (AM) voltage which is a filtered, full-wave, coherent, AM detected signal, the signal from said AGC integrator circuit to said receiver being an automatic gain control (AGC) voltage, said AGC integrator circuit also being supplied with a direct current AGC bias voltage from an AGC bias voltage source, said AGC bias voltages being identical for both automatic gain control circuits; each said receiver having an input and an output, each input receiving a diversity input signal, a received signal appearing on each output; a predetection diversity selector for selecting either the first or second received signal so as to maximize the signal-to-noise ratio of the received signals comprising:
a. a selector circuit having an output for generating a positive or negative direct-current voltage on said output, depending on whether the signal strength of the diversity input signal of said first receiver is greater than the signal strength of the diversity input signal of said second receiver or visa versa, said selector circuit being connected to receive said AM and AGC voltages from said first and second receivers.

12. The apparatus of claim 11 wherein said selector circuit comprises:
   a. first circuit means having an output for generating on said output a logarithmic signal that is the logarithm of the ratio of the diversity input signal strength of said first receiver to the diversity input signal strength of said second receiver as a function of the AM and AGC voltages of said first and second receivers, said first circuit means being connected to said first and second receivers; and
   b. second circuit means having an input and an output for generating a positive or negative direct-current voltage on said output, depending on whether said logarithmic signal is positive or negative, said second circuit means input being connected to said first circuit means output, said second circuit means output being said selector circuit output.

13. The apparatus of claim 12 wherein said logarithmic signal ($e_r$) is represented by the following relationship $$e_r = \frac{1}{K_1}(e_{g2} - e_{g1}) + \log\left(\frac{e_{a1}}{V}\right) - \log\left(\frac{e_{a2}}{V}\right)$$

where
$K_1$ is a constant defined by said first and second receiver parameters
$e_{g1}$ is the AGC voltage from said first receiver
$e_{g2}$ is the AGC voltage from said second receiver
$e_{a1}$ is the AM voltage from said first receiver
$e_{a2}$ is the AM voltage from said second receiver
$V$ is the AGC bias voltage from said first and second receiver, said AGC bias voltage being substantially identical for both receivers.

14. The apparatus of claim 12 wherein said first circuit means comprises:
   a. a first direct-current logarithmic amplifier having an input and an output;
   b. a second direct-current logarithmic amplifier having an input and an output;
   c. an operational amplifier having a positive input, a negative input, and an output, said logarithmic signal appearing on said operational amplifier output;
   d. a first resistor connected to said output of said first logarithmic amplifier and said negative input of said operational amplifier;
   e. a second resistor connected between said negative input of said operational amplifier and said AGC voltage of said first receiver;
   f. a third resistor connected between said positive input of said operational amplifier and said AGC voltage of said second receiver;
   g. a fourth resistor connected between said output of said second logarithmic amplifier and said positive input of said operational amplifier;
   h. a fifth resistor connected between said output of said operational amplifier and said negative input of said operational amplifier;
   i. a sixth resistor connected between said input to said first logarithmic amplifier and said AM voltage of said first receiver;
   j. a seventh resistor connected between said input to said second logarithmic amplifier and said AM voltage of said second receiver; and
   k. an eighth resistor connected between the positive input of said operational amplifier and a reference voltage.

15. The apparatus of claim 14 wherein the value of said sixth and seventh resistors ($R_{6,7}$) is given by the relationship
   $R_{6,7} = V/I_r$
where
   $V$ is the AGC bias voltage from said first and second receiver, said AGC bias voltages being substantially identical for both receivers
   $I_r$ is a reference current generated internally or externally to said first and second logarithmic amplifier.

16. The apparatus of claim 12 wherein said second circuit means comprises a zero-crossing detector.

17. The apparatus of claim 11 wherein said apparatus further comprises:
   switch means connected to said first and second receiver and to said selector circuit output for outputing either said first received signal or said second received signal, depending upon the voltage level of the signal appearing on the output of said selector circuit.

18. In combination with a first and second receiver each having an automatic gain control circuit comprising a full-wave, coherent AM detector, a low pass filter, and an AGC integrator circuit, said AM detector being connected between said receiver and said low pass filter, said low pass filter being connected between said Am detector and said AGC integrator circuit, said AGC integrator circuit being connected between said low pass filter and said receiver, the signal from said low pass filter to said AGC integrator circuit being an amplitude modulated (AM) voltage which is a filtered, full-wave, coherent, AM detected signal, the signal from said AGC integrator circuit to said receiver being an automatic gain control (AGC) voltage, said AGC integrator circuit also being supplied with a direct current AGC bias voltage from an AGC bias voltage source, said AGC bias voltages being identical for both automatic gain control circuits; each said receiver having an input and an output, each input receiving a diversity input signal, a received signal appearing on each output, a predetection, weighted, diversity combiner-selector for combining a first and second received signal from said first and second receiver and selecting either the first or the second received signal or the combined signal so as to maximize the signal-to-noise ratio of the received signals comprising:
   a. first circuit means receiving said AM and AGC voltages and said first received signal for weighting said first received signal with a combining ratio that is a function of said AM and AGC voltages, said first circuit means having an output;
   b. summing circuit means having an output for summing said weighted first received signal and said second received signal;
   c. means receiving said first and second received signal for determining the average phase angle between said first and second received signal and outputing a first or second voltage level, depending upon whether or not the average phase angle difference exceeds a certain predetermined limit or not;
   d. a selector circuit having an output for generating a positive or negative direct-current voltage on said output, depending upon whether the signal strength of the diversity input signal of said first receiver is greater than the signal strength of the diversity input signal of said second receiver or visa versa, said selector circuit being connected to receive said AM and AGC voltages from said first and second receivers.

19. The apparatus of claim 18 wherein said first circuit means includes:
   a. second circuit means for generating an exponent signal that is a function of said AM and AGC voltages; and
   b. third circuit means receiving said exponent signal and said first received signal for multiplying said first received signal by ten to the exponent signal to generate a multiplied signal, said third circuit means having an output upon which said multiplied signal appears, said multiplied signal being said first received signal weighted with said combining ratio.

20. The apparatus of claim 19 wherein said exponent signal ($e_w$) is represented by the following relationship $$e_w = \frac{2}{k_1}(e_{g2} - e_{g1}) + \log\left(\frac{e_{a1}}{V}\right) - \log\left(\frac{e_{a2}}{V}\right) \quad (48)$$

where
   $K_1$ is a constant defined by said first and second receiver parameters
   $e_{g1}$ is the AGC voltage from said first receiver
   $e_{g2}$ is the AGC voltage from said second receiver
   $ea1$ is the AM voltage from said first receiver
   $e_{a2}$ is the AM voltage from said second receiver
   $V$ is AGC bias voltage from said first and second receiver, said AGC bias voltage being substantially identical for both receivers.

21. The apparatus of claim 20 wherein said multiplied signal ($e_m$) is represented by the following relationship $$e_m = [S_1(t) + N_1(t)]\, 10^{e_w}.$$

where
   $S_1(t) + N_1(t)$ is the received signal from said first receiver
   $e_w$ is the exponent signal.

22. The apparatus of claim 19 wherein said second circuit means comprises:
   a. a first direct-current logarithmic amplifier having an input and an output;
   b. a second direct-current logarithmic amplifier having an input and an output;
   c. an operational amplifier having a positive input, a negative input, and an output, said exponent signal appearing on said operational amplifier output;
   d. a first resistor connected between said output of said first logarithmic amplifier and said negative input of said operational amplifier;
   e. a second resistor connected between said negative input of said operational amplifier and said AGC voltage of said first receiver;
   f. a third resistor connected between said positive input of said operational amplifier and said AGC voltage of said second receiver;
   g. a fourth resistor connected between said output of said second logarithmic amplifier and said positive input of said operational amplifier;
   h. a fifth resistor connected between said output of said operational amplifier and said negative input of said operational amplifier;
   i. a sixth resistor connected between said input to said first logarithmic amplifier and said AM voltage of said first receiver;
   j. a seventh resistor connected between said input to said second logarithmic amplifier and said AM voltage of said second receiver; and
   k. an eighth resistor connected between the positive input of said operational amplifier and a reference voltage.

23. The apparatus of claim 22 wherein the value of the sixth and seventh resistors ($R_{6,7}$) is given by the relationship
$$R_{6,7} = V/I_r$$
where
   $V$ is the AGC bias voltage from said first and second receiver, said AGC bias voltage being substantially identical for both receivers
   $I_r$ is a reference current generated internally or externally to said first and second logarithmic amplifiers.

24. The apparatus of claim 19 wherein said third circuit means comprises:
   a. a differential amplifier circuit having common emitters, said differential amplifier circuit being inputed by said exponent signal; and
   b) a common emitter circuit having a collector connected to said common emitters of said differential amplifier circuit, said common emitter circuit being inputed by said first received signal.

25. The apparatus of claim 24 wherein said differential amplifier circuit comprises:
   a. a first transistor having a base, an emitter and a collector;
   b. a second transistor having a base, an emitter, and a collector, said first and second transistor being substantially identical, said second transistor base being connected to a first bias voltage, said second transistor emitter being connected to said first transistor emitter, said second transistor collector being connected to a second bias voltage;
   c. a first resistor connected between the base of said first transistor and said exponent signal;
   d. a second resistor connected between the base of said first transistor and a reference voltage; and
   e. a third resistor connected between the collector of said first transistor and a second bias voltage, said collector of said first transistor being the output of said first circuit means.

26. The apparatus of claim 25 wherein said common emitter circuit includes:
   a. a third transistor having an emitter, a collector, and a base, said third transistor collector being connected to said first and second transistor emitters, said third transistor base being connected to receive said first received signal;
   b. a capacitor having a first and a second side, said first side being connected to a reference voltage; and
   c. a fourth resistor being connected between said third transistor emitter and said second side of said capacitor.

27. The apparatus of claim 26 wherein the values of said first ($R_1$), second ($R_2$), third ($R_L$), and fourth ($R_E$) resistors are given by the following relationships $$\frac{R_L}{R_E} = 1 + 10^{\left(\frac{V_B}{K}\right)}$$

and $$K = \frac{R_2}{R_1 + R_2}$$

where
K is a constant associated with said differential amplifier
$V_B$ is said first bias voltage.

28. The apparatus of claim 18 wherein said selector circuit comprises:
   a. second circuit means having an output for generating on said output a logarithmic signal that is the logarithm of the ratio of the diversity input signal strength of said first receiver to the diversity input signal strength of said second receiver as a function of the AM and AGC voltages of said first and second receivers, said first circuit means being connected to said first and second receivers; and
   b. third circuit means having an input and an output for generating a positive or negative direct-current voltage on said output, depending on whether said logarithmic signal is positive or negative, said second circuit means input being connected to said first circuit means output, said second circuit means output being said selector circuit output.

29. The apparatus of claim 28 wherein said logarithmic signal ($e_r$) is represented by the following relationship $$e_r = \frac{1}{K_1}(e_{g2} - e_{g1}) + \log\left(\frac{e_{a1}}{V}\right) - \log\left(\frac{e_{a2}}{V}\right)$$

where
$K_1$ is a constant defined by said first and second receiver parameters
$e_{g1}$ is the AGC voltage from said first receiver
$e_{g2}$ is the AGC voltage from said second receiver
$e_{a1}$ is the AM voltage from said first receiver
$e_{a2}$ is the AM voltage from said second receiver
$V$ is the AGC bias voltage from said first and second receiver, said AGC bias voltage being substantially identical for both receivers.

30. The apparatus of claim 28 wherein said second circuit means comprises:
   a. a first direct-current logarithmic amplifier having an input and an output;
   b. a second direct-current logarithmic amplifier having an input and an output;
   c. an operational amplifier having a positive input, a negative input, and an output, said logarithmic signal appearing on said operational amplifier output;
   d. a first resistor connected to said output of said first logarithmic amplifier and said negative input of said operational amplifier;
   e. a second resistor connected between said negative input of said operational amplifier and said AGC voltage of said first receiver;
   f. a third resistor connected between said positive input of said operational amplifier and said AGC voltage of said second receiver;
   g. a fourth resistor connected between said output of said second logarithmic amplifier and said positive input of said operational amplifier;
   h. a fifth resistor connected between said output of said operational amplifier and said negative input of said operational amplifier;
   i. a sixth resistor connected between said input to said first logarithmic amplifier and said AM voltage of said first receiver;
   j. a seventh resistor connected between said input to said second logarithmic amplifier and said AM voltage of said second receiver; and
   k. an eighth resistor connected between the positive input of said operational amplifier and a reference voltage.

31. The apparatus of claim 30 wherein the value of said sixth and seventh resistors ($R_{6,7}$) is given by the relationship $$R_{6,7} = V/I_r$$

where
$V$ is the AGC bias voltage from said first and second receiver, and AGC bias voltage being substantially identical for both receivers
$I_r$ is a reference current generated internally or externally to said first and second logarithmic amplifier.

32. The apparatus of claim 28 wherein said third circuit means comprises a zero-crossing detector.

33. The apparatus of claim 18 wherein said average phase angle determining means comprises:
   a. a mixer having a first and second input and an output, said first and second inputs being connected to receive said first and second received signals, respectively;
   b. a low pass filter having an input and an output, said filter input being connected to said mixer output, a phase signal appearing on said filter output whose voltage level is proportional to the average phase angle between said first and second received signals; and
   c. a threshold detector having a predetermined threshold voltage, said detector being connected to receive said phase signal and output a positive or negative voltage level depending on whether or not said phase signal exceeds said threshold voltage.

34. The apparatus of claim 18 further comprising:
   a. first switch means communicating with said selector circuit output and being connected to receive said first and second received signals, said first switch means having an output, said first or said second received signal, but not both appearing on said first switch means output, depending on whether the voltage level from said selector circuit output is positive or negative; and
   b. second switch means communicating with said average phase angle difference means output and being connected to receive the signal from said first switch means output and said said signal from said summing circuit output, said second switch means having an output, said signal from said first switch means output or said signal from said summing circuit output but not both appearing on said second switch means output depending on whether the voltage level from said average phase angle difference means output is positive or negative.

35. In combination with a first and second receiver having a common automatic gain control (AGC) feedback circuit, a predetection, weighted, diversity combiner for combining a first and second coherent received signal from said first and second receiver so as to maximize to signal-to-noise ratio of the received signals comprising:
- a. first circuit means for coherently detecting and filtering said first received signal, said means outputing a detected and filtered signal;
- b. a first mixer having an input for multiplying said first received signal by said detected and filtered signal from said first circuit means, said mixer outputing a first mixed signal;
- c. second circuit means for coherently detecting and filtering said second received signal, said means outputing a detected and filtered signal;
- d. a second mixer having an input for multiplying said second received signal by said second detected and filtered signal from said second circuit means, said mixer outputing a second mixed signal;
- e. a summing circuit for summing said first and second mixed signals, said summing circuit having a first and second output, said first output being connected to said AGC circuit, said second output being the output of said combiner.

36. The apparatus of claim 35 wherein said first circuit means comprises:
- a. a first fullwave, coherent, amplitude-modulation detector being connected to receive said first received signal, said first detector having an output; and
- b. a first low pass filter having an input and an output, said first filter input being connected to said first detector output, said first filter output being connected to said first mixer input.

37. The apparatus of claim 35 wherein said second circuit means comprises:
- a. a second fullwave, coherent amplitude-modulation detector being connected to receive said first received signal, said detector having an output; and
- b. a second low pass filter having an input and an output, said second filter input being connected to said second detector output, said second filter output being connected to said second mixer input.

* * * * *